(12) United States Patent
Porter et al.

(10) Patent No.: US 6,516,706 B2
(45) Date of Patent: Feb. 11, 2003

(54) ACTUATOR HAVING INTERNAL VALVE STRUCTURE

(75) Inventors: Don B. Porter, Avra Valley, AZ (US); Wayne D. Shapiro, Chandler, AZ (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 09/917,066

(22) Filed: Jul. 26, 2001

(65) Prior Publication Data

US 2001/0042435 A1 Nov. 22, 2001

Related U.S. Application Data

(63) Continuation of application No. 09/378,207, filed on Aug. 19, 1999, now abandoned.

(51) Int. Cl.[7] ................................................. F15B 11/08
(52) U.S. Cl. ........................................... 91/420; 91/445
(58) Field of Search ................................ 92/164, 169.1; 91/459, 461, 462, 418, 445, 455, 444, 446, 447, 448, 466, 467, 420

(56) References Cited

U.S. PATENT DOCUMENTS

| | | |
|---|---|---|
| 1,088,002 A | 2/1914 | White et al. |
| 2,455,948 A | 12/1948 | Ray |
| 2,457,467 A | 12/1948 | Hartman |
| 2,570,383 A | 10/1951 | Russell |
| 2,631,431 A | 3/1953 | Grebe |
| 2,672,731 A | 3/1954 | Ashton |
| 2,751,753 A | 6/1956 | Ray |
| 2,841,960 A | 7/1958 | Holan et al. |
| 2,885,860 A | 5/1959 | Ray |
| 2,939,283 A | 6/1960 | Ashton |
| 2,944,400 A | 7/1960 | Ashton |
| 2,976,845 A | 3/1961 | Goldring |

(List continued on next page.)

Primary Examiner—Edward K. Look
Assistant Examiner—Michael Leslie
(74) Attorney, Agent, or Firm—Franklin Gubernick (57) ABSTRACT

A hydraulic cylinder in which the cylinder head contains the main control valve for the cylinder. In one fluid path from the main control valve to an area located on one side of the cylinder's piston, fluid is directed through a transfer tube that extends through the center of the piston and terminates within a hollow ported section of the piston rod. The cylinder head can additionally include two electrically-actuated pilot valves and two pilot-operated check valves. The pilot-operated check valves are located in different passages that extend to areas located on opposite sides of the piston. The pilot-operated check valves include structure that, in combination with passages in the cylinder head, cause both pilot-operated check valves to open when pressurized fluid is being directed to one of the pilot-operated check valves by the main control valve. In the preferred embodiment, electrical wiring to the cylinder head travels through one of the fluid hoses connected to the cylinder.

15 Claims, 6 Drawing Sheets

U.S. PATENT DOCUMENTS

| | | | |
|---|---|---|---|
| 2,978,283 A | 4/1961 | Rosen | |
| 3,029,904 A | 4/1962 | Goldring | |
| 3,202,062 A | 8/1965 | Burden | |
| 3,331,289 A | 7/1967 | Vander Horst | |
| 3,338,136 A | 8/1967 | Jerome et al. | |
| 3,394,544 A | 7/1968 | Jackobice | |
| 3,555,966 A | 1/1971 | Coniglio | |
| 3,635,242 A | 1/1972 | Coutenay et al. | |
| 3,698,187 A | 10/1972 | Logan | |
| 3,828,556 A | 8/1974 | Nolden | |
| 3,902,318 A | 9/1975 | Becker et al. | |
| 3,905,279 A | 9/1975 | Yadon | |
| 3,928,968 A | 12/1975 | Becker et al. | |
| 4,099,450 A * | 7/1978 | Mase | 91/447 X |
| 4,165,675 A | 8/1979 | Cryder et al. | |
| 4,201,052 A * | 5/1980 | Breeden et al. | 91/461 X |
| 4,280,396 A | 7/1981 | Zeuner et al. | |
| 4,355,565 A | 10/1982 | Bianchetta | |
| 4,418,612 A * | 12/1983 | Nanda | 91/446 X |
| 4,590,764 A | 5/1986 | Escobosa | |
| 4,630,441 A | 12/1986 | Chamberlain | |
| 4,665,699 A | 5/1987 | Krusche | |
| 4,667,472 A | 5/1987 | Clay et al. | |
| 4,716,729 A | 1/1988 | Kakeya | |
| 4,718,329 A | 1/1988 | Nakajima et al. | |
| 5,044,445 A | 9/1991 | Kayahara | |
| 5,186,095 A | 2/1993 | Todd | |
| 5,331,882 A | 7/1994 | Miller | |
| 5,351,599 A | 10/1994 | Stoll | |
| 5,375,418 A * | 12/1994 | Shelhart | 91/420 |
| 5,454,291 A | 10/1995 | Ulm et al. | |
| 5,568,759 A | 10/1996 | Aardema | |
| 5,758,862 A | 6/1998 | Sturman | |
| 5,823,088 A | 10/1998 | Frisch | |
| 6,173,639 B1 * | 1/2001 | A'Hearn et al. | 91/447 X |

* cited by examiner

ACTUATOR HAVING INTERNAL VALVE STRUCTURE

This is a continuation of application Ser. No. 09/378,207 filed Aug. 19, 1999.

FIELD OF THE INVENTION

The invention is in the field of hydraulic equipment. More particularly, the invention is a hydraulic cylinder designed to inwardly contain major portions of its control system. The cylinder furthermore includes a unique internal structure that optimizes the functionality of the unit.

BACKGROUND OF THE INVENTION

Hydraulic systems are often employed in machines that are used in harsh environments and must therefore be reliable and preferably require a minimum of maintenance. Examples of such equipment are backhoes and front-end loaders. In machines of this type, the hydraulic systems are sized and designed to give the machine the capacity to accomplish work that requires the application of significant amounts of power.

The above-described systems typically include a large-horsepower diesel engine that can both propel the machine and drive a high-capacity hydraulic pump. The operator of the machine controls the operation of the machine's hydraulically-actuated components through the use of valves that affect the flow of hydraulic fluid to said components. In this manner, pressurized fluid is selectively directed to linear actuators, in the form of hydraulic cylinders, to accomplish the required work.

The application of pressurized fluid to a hydraulic cylinder in a predetermined manner will cause the cylinder's inwardly-contained piston to move within the body of the cylinder. As a result, the piston rod attached to the piston will be either extended from, or retracted into, the cylinder to cause the desired movement of the machine's member(s) attached to the cylinder.

In typical hydraulic systems, the control valve that is responsible for the operation of any particular hydraulic cylinder is located at a distance from the cylinder. Long flexible hoses and pipes are then used to connect the control valve to the cylinder and to a source of pressurized fluid. Another set of hoses and pipes will usually also be employed to provide a flow path for returning fluid to a reservoir, also known as a sump. Depending on the complexity of the system, additional hoses may be employed between main and pilot valves and between system check valves and the control and/or pilot valve(s).

One problem with prior art hydraulic systems is that by the time the pump, reservoir, and all the different valves and hydraulic cylinders are connected together, the end result is a large number of hoses, fittings and pipes located in damage-prone areas. The hoses are susceptible both to punctures and to environmental degradation.

Another problem with prior art hydraulic systems is that not only are the hoses prone to being damaged, all of the different components and hoses are connected together by fittings that are subject to leakage. Leakage problems are exacerbated when the equipment is being used in an environmentally-sensitive area where any leaked hydraulic fluid must be recovered along with any contaminated soil. In this manner, even minor leaks pose safety and maintenance problems.

In some hydraulic systems, the use of connecting hoses is minimized by mounting the hydraulic cylinder's control valve directly onto the side of the hydraulic cylinder. However, this results in the control valve being located in an exposed area where it can be damaged by falling debris or by accidental contact with external structure or formations.

SUMMARY OF THE INVENTION

The invention is a hydraulic cylinder having a design optimized for durability, convenience and overall low cost. The cylinder may be employed in almost any machine in which a hydraulic cylinder is required. The invention is especially useful for employment in machines subject to harsh usage and environmental conditions, such as earth-working machinery including front-end loaders, bulldozers, etc.

A hydraulic cylinder in accordance with the invention is similar in outward appearance to most standard hydraulic cylinders. However, the head portion of the cylinder, also known as a cylinder head, includes the cylinder's main control valve. The cylinder head preferably further includes one or more electrically-actuated pilot valves and other ancillary components required to control fluid flow to the cylinder, such as one or more pilot-operated check valves.

Like prior art hydraulic cylinders, the cylinder in accordance with the invention is elongated in shape and includes a movable piston attached to one end of a piston rod. However, to optimize the performance of the valve and to make best use of the above-described structure of the cylinder head, a fluid transfer tube and hollow piston rod are employed within the cylinder. The tube extends from the cylinder head through the center of the piston and into the interior of the piston rod. The piston rod features at least one port located near the piston to enable fluid flow between the interior area of the piston rod and the interior area of the cylinder surrounding the piston rod. This creates an internal fluid path that extends from the cylinder head, through the transfer tube, through the interior of the piston rod, and then into the area of the cylinder surrounding the piston rod. In said area, the fluid can apply pressure to a bottom surface of the piston. In the prior art, this transfer tube is located outside the cylinder and is therefore subject to being damaged.

The cylinder head additionally includes a port through which fluid can be transferred directly from the cylinder head to an area located within the cylinder and in front of the piston. When fluid is selectively diverted into this area, the fluid can apply pressure to the top surface of the piston. The fluid flow to the above-noted port or to the transfer tube is controlled by the main control valve.

In the preferred embodiment, the main control valve is a spool-type valve controlled by two pilot valves. Both pilot valves are also located in the cylinder head. Each pilot valve is preferably electrically actuated via a solenoid. The solenoid for each pilot valve is also preferably located within the cylinder head in a location where it is easily serviceable.

The electrical wiring to the solenoids extends out of the cylinder head and is operatively connected to a remotely-located control switch. In this manner, electrical actuation of the control valve structure may be achieved by an operator through actuation of a switch.

In the preferred embodiment of the invention, the hydraulic fluid return line/hose inwardly contains the wires that connect the solenoids to the operator-actuated control switch. This minimizes the number of components of the system exposed to the external environment.

To ensure the desired direction of fluid flow, the cylinder head preferably also includes two pilot-operated check valves. The first of said valves is in the fluid path leading to the cylinder area in front of the piston, i.e.—the area located between the piston and the cylinder head. The other of said valves is in the fluid path that leads to the area behind the piston, i.e.—the area of the cylinder surrounding the piston rod. Preferably, when one pilot-operated check valve is opened to allow the flow of pressurized fluid to the cylinder, the other pilot-operated check valve will also be opened to provide a return path for fluid displaced from the cylinder. Also in the preferred embodiment, each of the pilot-operated check valves can be fluid locked into a closed position to maintain the piston in a stationary position when the control valve is in a neutral condition.

By encasing the hydraulic cylinder's main control valve and other fluid-related components within the cylinder head, the components are protected from damage. Furthermore, the number of hoses and fittings required for the hydraulic system are significantly reduced. As a result, the invention provides a hydraulic cylinder that avoids most of the problems of the prior art. Furthermore, the hydraulic cylinder has a shape and space envelope similar to most conventional units. In many cases, this allows the invention to be substituted for a conventional unit.

DETAILED DESCRIPTION OF THE DRAWINGS

Referring now to the drawings in greater detail, wherein like characters refer to like parts throughout the several figures, there is shown by the numeral 1 a hydraulic cylinder in accordance with the invention.

Figure 1:
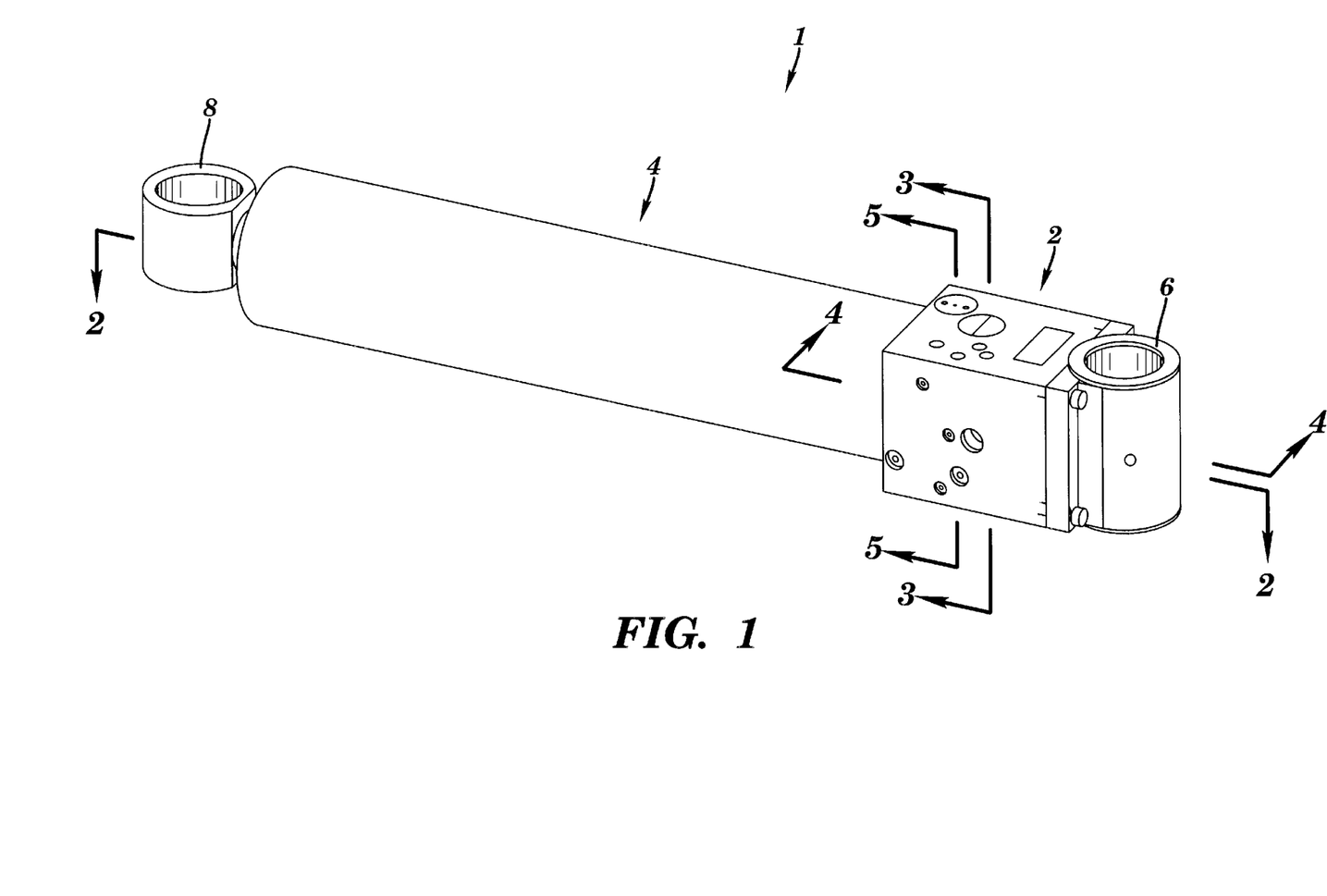
FIG. 1 is a perspective view of a hydraulic cylinder in accordance with the invention.

The cylinder includes a cylinder head portion 2 (cylinder head) and a body portion 4. Forming an end of the cylinder head portion is a clevis 6. The clevis is a tubular member designed to be secured to a portion of a machine, such as a pivoting arm of a backhoe (not shown).

A second clevis 8 is shown at the opposite end of the cylinder 1 from the clevis 6. The clevis 6 would normally be secured to a machine in a manner whereby action of the cylinder will cause a change in distance between clevis 6 and a movable member to which clevis 8 is secured.

Figure 2:
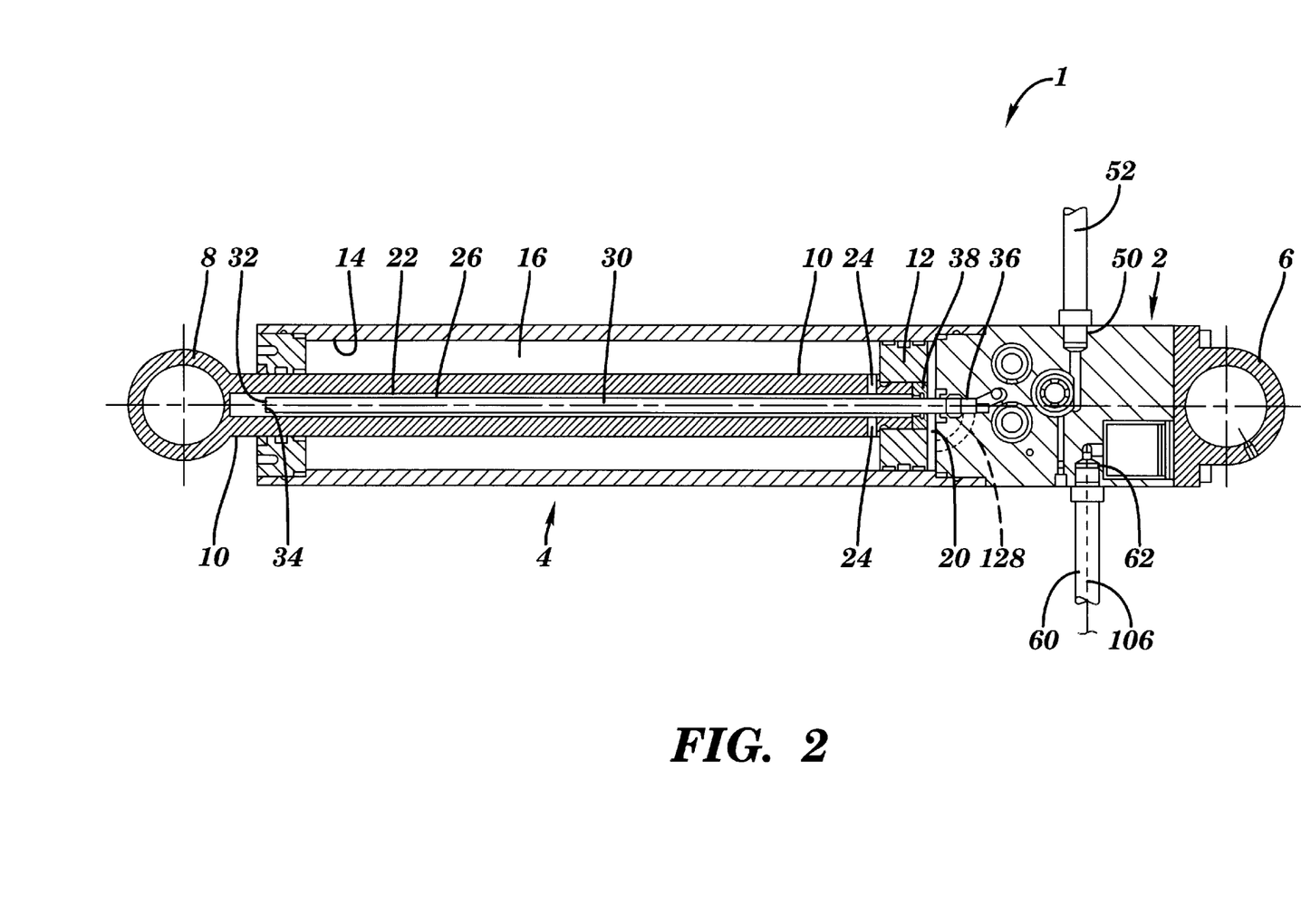
FIG. 2 is a cross-sectional view of the cylinder shown in FIG. 1 and taken at the plane labeled 2—2 in FIG. 1. In this view, portions of the hoses attached to the cylinder are also shown.

FIG. 2 provides a cross-sectional view of the cylinder 1. In this view, one can see that the clevis 8 is located at a first end of a piston rod 10. A piston 12 is secured to a second end of the piston rod 10. The piston is capable of sliding, in a substantially sealing manner, along the cylinder's interior wall 14 in a direction parallel to the cylinder's longitudinal axis. FIG. 2 shows the hydraulic cylinder 1 in a substantially fully retracted position wherein the piston is located proximate its closest point to the cylinder head portion 2.

As also shown in FIG. 2, within the body portion 4 of the cylinder is a first interior cavity or area 16 that is located to the left of the piston, and a second interior cavity or area 20 located to the right of the piston. Upon the appropriate application of hydraulic force, as will be more fully described shortly, the piston can be caused to move to the left so as to reduce the total volume of area 16 and increase the total volume of area 20. When the piston moves to the left, the distance between clevis 6 and clevis 8 will increase. Once the piston has been moved to the left of the position shown, reversing the fluid flow will cause the piston to move back to the right.

One should also note in FIG. 2 that the piston rod 10 is a hollow tube that has an interior wall 22. The piston rod includes a plurality of outlet ports 24, located adjacent to the bottom of the piston, so that they will always be located within area 16. The ports 24 function to connect the interior area 26 of the piston rod (the area bounded by wall 22) with area 16 of the body portion of the cylinder.

Located partially within the interior area 26 of the piston rod is a hollow transfer tube 30. The tube includes an opening 32 at its bottom end 34. The opening 32 opens into the interior area 26 of the piston rod. The top end 36 of the transfer tube is fixedly secured to the cylinder head portion 2. One should note that the transfer tube extends through a seal 38 located in the center of the piston. Since the piston slides on the tube, the seal is preferably made of a low friction material, such as TEFLON.

Figure 3:
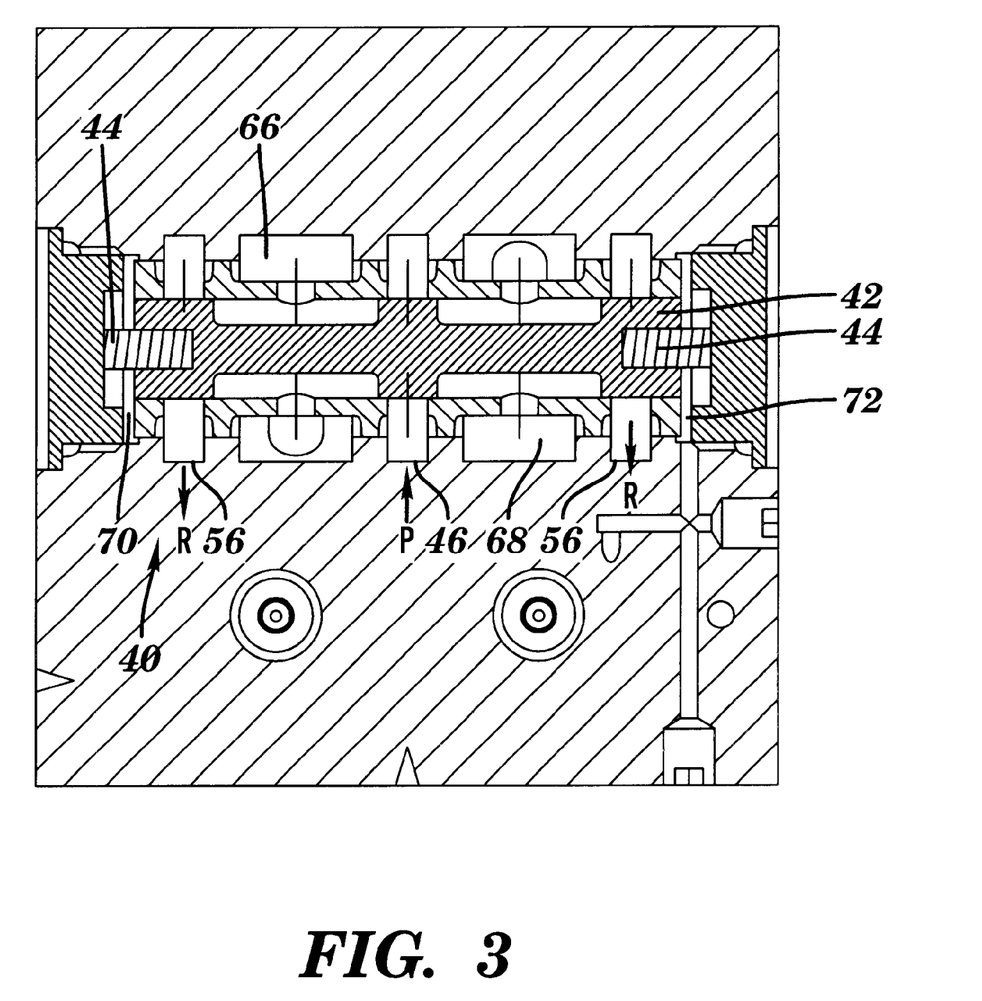
FIG. 3 is a first cross-sectional view of the head portion of the cylinder shown in FIG. 1, taken at the plane labeled 3—3 in FIG. 1.
Figure 4:
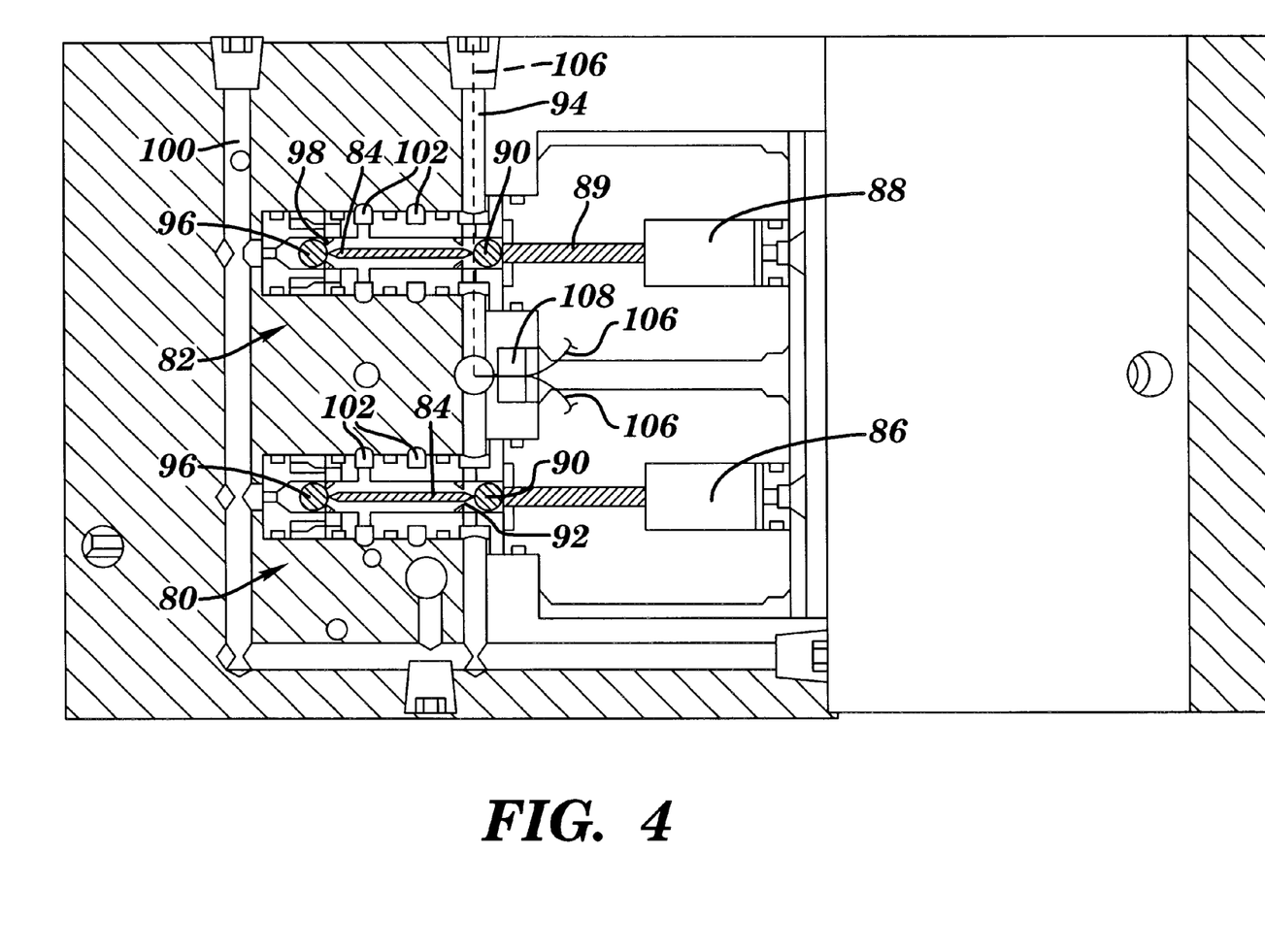
FIG. 4 is a second cross-sectional view of the head portion of the cylinder shown in FIG. 1, taken at the plane labeled 4—4 in FIG. 1.
Figure 5:
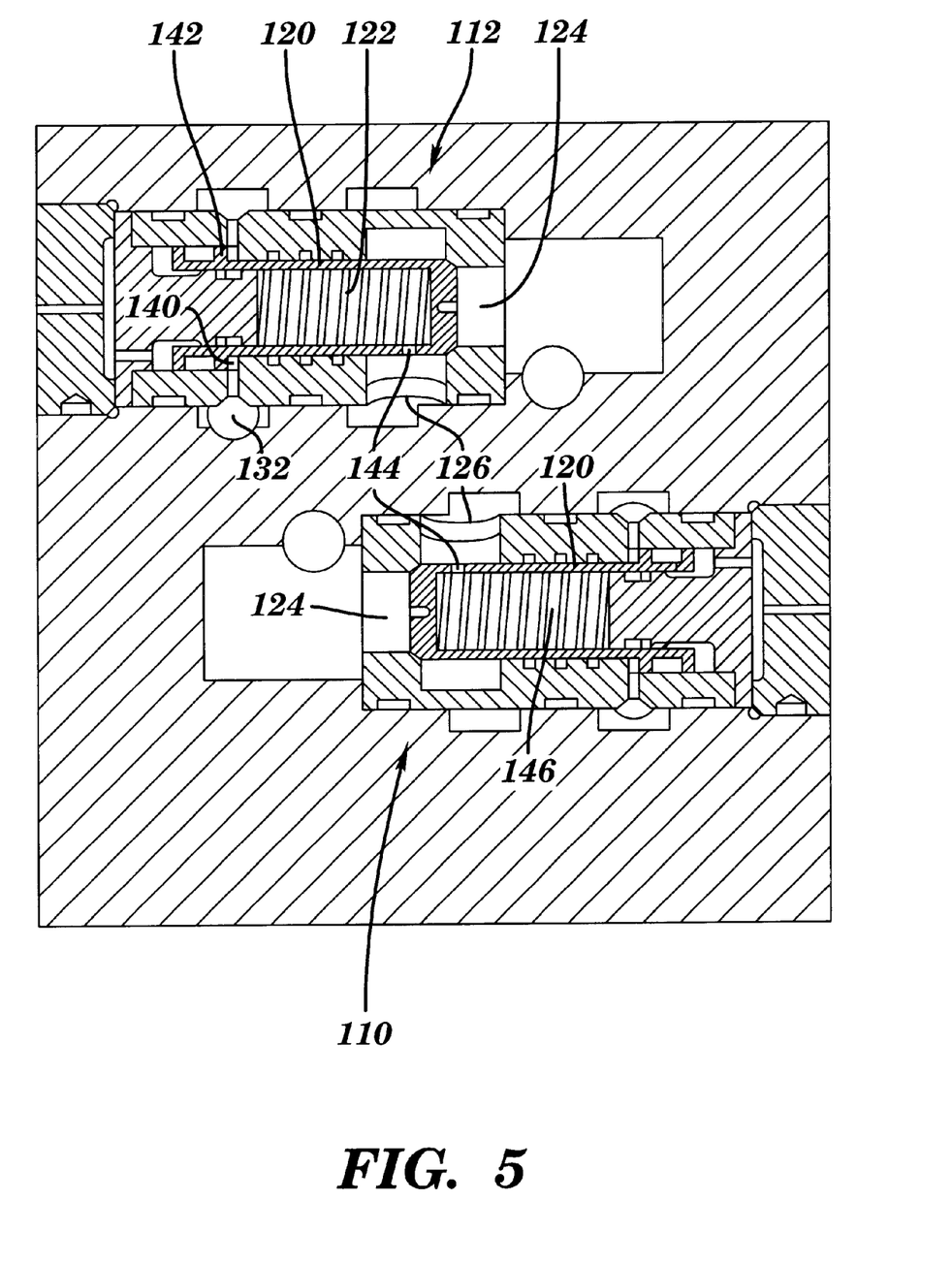
FIG. 5 is a third cross-sectional view of the head portion of the cylinder shown in FIG. 1, taken at the plane labeled 5—5 in FIG. 1.
Figure 6:
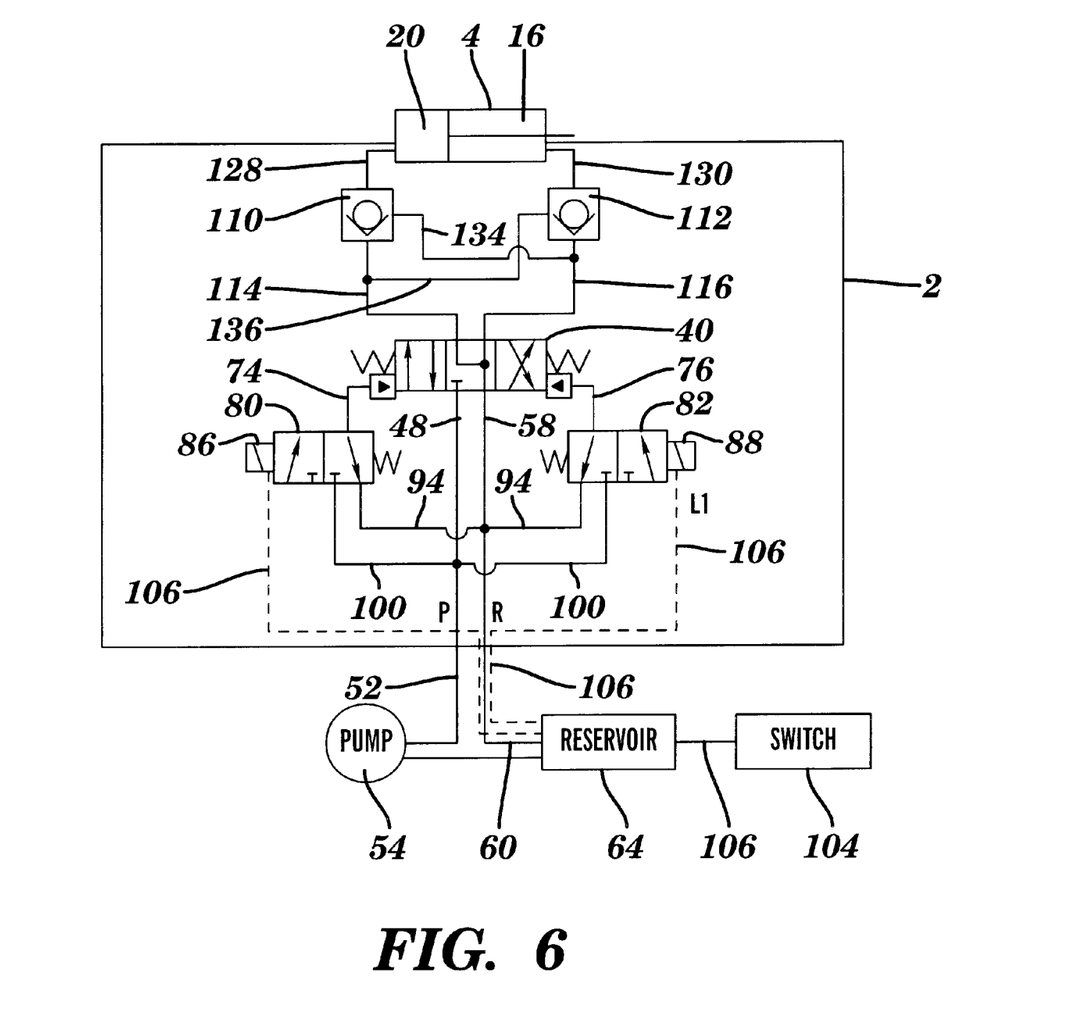
FIG. 6 is a flow diagram for the cylinder shown in FIG. 1. The figure also shows how the cylinder is connected to selected exterior components.

In FIGS. 3–5, different cross-sections of the cylinder head are provided to give the reader an understanding of the different components in the cylinder head. While most of the flow paths between components are shown in the various detailed drawings, FIG. 6 provides a standard symbol flowchart for the cylinder in which all of the flow paths are depicted. It should be noted that the cylinder head is depicted in FIG. 6 as box 2 and contains all of the flow paths shown within said box.

FIG. 3 provides a first cross-sectional view of the cylinder head portion 2. In this view, one can see the main control valve 40. The valve is a conventional spool valve and includes a spool, also known as a slide, 42 that is centered by springs 44. The valve includes a center-located port 46 through which pressurized fluid can flow into the valve. The port is continuous with a passage 48 in the cylinder head that leads to inlet port 50, located on the side of the cylinder head (note FIGS. 2 and 6). Connected to port 50 is a high pressure fluid hose 52. The hose is shown in FIG. 6 as being connected to the outlet of a high-capacity pump 54.

The valve also includes two ports 56 for the return flow of fluid. The ports 56 are connected to an interior passage 58 in the cylinder head. Passage 58 leads to an exterior hose 60 secured to outlet port 62 in the cylinder head (note FIGS. 2 and 6). As shown in FIG. 6, hose 60 leads to a fluid reservoir 64 that supplies fluid to the previously noted pump 54.

The valve further includes a first cylinder port 66 and a second cylinder port 68. These ports eventually lead to the areas 16 and 20 in the body portion of the cylinder, wherein fluid flow via these ports will cause piston 12 to move. A fuller description of the flow path will be described in conjunction with a description of the other components of the cylinder head.

Prior to describing how fluid is directed into the body portion of the hydraulic cylinder, it is important to understand the mechanism that causes movement of the control valve's spool 42. At each end of the spool is an area 70, 72. Each area is connected by an interior passage 74 or 76 in the cylinder head (note FIG. 6) to an associated pilot valve 80 or 82. The pilot valves are shown in FIG. 4.

FIG. 4 provides a second cross-sectional view of the cylinder head in which a different portion of the cylinder head is viewable. In this view, one can see that the two pilot valves 80, 82 are structurally identical and are located in a side-by-side relation. The pilot valves are simple in design and make use of a movable center rod 84 that has a triangular cross-section. Each pilot valve is operated by an associated solenoid 86 or 88.

When either solenoid is electrically actuated, the solenoid's plunger 89 is caused to move to the left. The plunger pushes a ball 90 onto a seat 92, thereby closing off the center of the pilot valve from passage 94. Passage 94 connects to passage 58, the primary line for the return flow of fluid to the reservoir.

When ball 90 moves to the left, it pushes rod 84 to the left. As a result, the tip of rod 84 pushes a ball 96 off an associated seat 98 located in an inlet to passage 100. Passage 100 connects to passage 48, the primary line in the cylinder head portion that carries pressurized fluid from the pump. Therefore, when ball 96 is unseated, pressurized fluid is allowed to flow into the body of the associated pilot valve. Since rod 84 has a triangular cross-section and the center bore of the valve body has a round cross-section, fluid can flow through the valve by passing between the sides of the rod and the circular wall of the valve's bore. As can be seen in FIG. 4, the valve has two ports 102 that open into the valve's center bore. When either of balls 90 or 96 are unseated, the fluid path will be into or out of ports 102, through the valve's bore, and then past the unseated ball. In valve 80, both of its ports 102 are connected to fluid passage 74, which leads to area 70 of the main control valve. In valve 82, both of its ports 102 lead to fluid passage 76, which leads to area 72 of the main control valve. In this manner, pressurized fluid can be selectively diverted by the pilot valves to one of the areas 70 or 72 of the main control valve to cause a shifting of slide 42.

When a solenoid is de-energized, the solenoid's plunger 89 moves to the right. This allows ball 96 to move into its seat and ball 90 to move off its seat. As a result, the flow of pressurized fluid from passage 100 is stopped and the interior of the valve is opened to passage 94, the fluid return passage. In this manner, when one solenoid is energized, the associated pilot valve sends pressurized fluid to one end of slide 42. As the slide moves, the displaced fluid from the opposite end of the slide can flow back to the return line 100 via the pilot valve associated with the non-energized solenoid.

The solenoids 86, 88 are conventional in design and are electrically connected to a user-actuable switch or similar control 104 (shown in FIG. 6) via wires 106. In the preferred embodiment, the wires 106 from the solenoids pass through a seal 108, enter passage 94 and then continue through the fluid return passage 58 in the cylinder head. The wires then exit the cylinder head via the center of the fluid return port 62 and hose 60. It should be noted that hose 60 is preferably a standard hose, and that wires 106 run through the hose's interior. The wires follow the fluid path through hose 60 and thereby enter the fluid reservoir 64 through the connection for hose 60. The wires then exit the reservoir, preferably via the reservoir's vent tube (not shown), and continue to the switch/control 104.

Alternatively, but not shown, the wires 106 can run through the pressurized fluid path and exit hose 52 at its connection to the pump. As another alternative that is not shown, a 'T'-shaped coupling can be placed in port 62 of the cylinder head, with hose 60 connecting to one arm of the 'T' and wires 106 passing through a seal in the other arm of the 'T'. In another alternative that is not shown, the wires can extend through a dry passage in the cylinder head and exit an access port (not shown) in the cylinder head. In the latter two cases, the wires would then run directly to the switch/control 104 via any desired route.

FIG. 5 shows another cross-sectional view of the cylinder head 2. At the location where this cross-section is taken, one can see first and second identical pilot-operated check valves 110 and 112. Pilot-operated check valve 110 is located at the end of a passage 114, the passage that leads to the first cylinder port 66 of the main control valve 40. Pilot-operated check valve 112 is located at the end of passage 116, the passage that leads to the second cylinder port 68 of the main control valve (note FIG. 6).

Each of pilot-operated check valves 110 and 112 includes a poppet 120 that is outwardly-biased by a spring 122. The end-located port 124 of each valve connects to one of the passages 114 or 116. Each pilot-operated check valve also includes a side-located port 126. In pilot-operated check valve 110, port 126 leads to passage 128, the passage that leads to area 20 in the body portion of the cylinder. In pilot-operated check valve 112, port 126 leads to passage 130, the passage that leads to area 16 in the body portion of the cylinder.

Additionally, each pilot-operated check valve includes a port 132 that is connected to one of passages 134 or 136 (note FIG. 6). Passage 134 taps off passage 116 and passage 136 taps off passage 114 (note FIG. 6). Port 132 leads to a small area 140 adjacent the body of the poppet and that is bounded on one side by a flange portion 142 of the poppet. Pilot control of the check valve occurs when the main control valve is actuated and causes pressurized fluid to be sent through port 132 from one of the fluid passages 114 or 116 via the associated fluid passage 136 or 134. The pressurized fluid will apply pressure on the poppet's flange portion 142. This will cause the poppet to move down, i.e.—compress the spring 122 and uncover ports 124 and 126. When this occurs, fluid is allowed to flow into port 126 and out port 124. Therefore, pilot operation refers to operation of the valve through the action of another valve or mechanism.

The poppet of each pilot-operated check valve includes a side-located weep hole 144 that faces port 126. The weep hole leads to an otherwise sealed interior area 146 of the poppet. When both pilot-operated check valves are closed, such as when the main control valve is in a neutral position, fluid can flow into the interior area of the poppet via port 126 and the weep hole. The fluid fills the interior area of the poppet and, in combination with the spring, forces the end of the poppet against port 124. This prevents any fluid flow through the pilot-operated check valve, thus the position of the piston in the cylinder is maintained against a load.

The function of the cylinder 1 relies on the interaction between the various previously described components. The following steps/actions would occur to cause the piston rod 10 to move outwardly from the position shown in FIGS. 1 and 2, so as to increase the distance between clevis 6 and clevis 8. The following description will make use of both the detailed views and the flow diagram provided in FIG. 6.

The first step involves a user actuating the user-actuable control/switch 104. The switch 104 may actually be a single switch, or a series of connected components, such as a switch or joystick connected to a microprocessor, which is then connected to wires 106. Once actuation has occurred, an electrical signal is sent through a particular wire within the wire bundle 106. The signal travels to solenoid 86 and causes the solenoid's plunger 89 to move to the left. This pushes ball 90 into seat 92, thereby closing off the interior of the valve from the fluid return passage 94. When ball 90 moved to the left, it also pushed rod 84 of pilot valve 80 to the left. As rod 84 moves to the left, its left tip pushes ball 96 off seat 98. This allows pressurized fluid to flow from passage 100, around ball 96, into the body of valve 80 and then exit valve 80 via ports 102. Both of ports 102 of valve 80 lead to fluid passage 74, through which the fluid passes and then enters area 70 of the main control valve. The fluid applies pressure to the left end of the control valve's slide 42 and causes said slide to move to the right. It should be noted that as the slide moves to the right, fluid leaves area 72 of the main control valve, flows through passage 76 and into the body of pilot valve 82 via its ports 102. Fluid leaves valve 82 by flowing along the exterior of rod 84, past seat 92 (note, ball 90 of valve 82 is not pressed against its seat since solenoid 88 is not energized), into passage 94, and then into reservoir 64 via the cylinder head's fluid return passage 58 and hose 60.

Once slide 42 has moves a sufficient distance to the right, fluid flow is enabled from port 46, through the body of the control valve, and out the valve's port 66. The pressurized fluid then flows through passage 114 to port 124 of pilot-operated check valve 110. The fluid applies pressure to the end of the pilot-operated check valve's poppet 120 and pushes said poppet into the valve, compressing spring 122 and forcing a portion of the fluid located within the poppet out the poppet's weep hole 144. This eventually causes the end of the poppet to uncover port 126 and allow pressurized fluid to travel into passage 128. As can be seen in FIG. 2, passage 128 extends through the cylinder head and opens into area 20 of the cylinder's body portion. The fluid flows through passage 128 and into area 20. The pressurized fluid then applies pressure onto the top face of the piston 12 and pushes the piston in a direction away from the cylinder head portion 2. The outer periphery of the piston slides on the body portion's interior wall 14, as the center of the piston slides on the transfer tube 30.

It should be noted that the pressurized fluid located in passage 114 will also flow into passage 136. The fluid will then go through port 132 of pilot-operated check valve 112 and into said valve's area 140. Once in area 140, the fluid applies pressure to the flange portion 142 of the valve's poppet 120. This causes said poppet to move away from its end-located port 124 and to compress its spring 122. As the poppet compresses the spring and fluid is expelled from the interior of the poppet via its weep hole 144. The poppet continues to move until a flow path between port 124 and port 126 of valve 112 is established. As the piston 12 moves away from the cylinder head portion 2, the volume of area 20 will increase and the volume of area 16 will decrease. The displaced fluid from area 16 flows through ports 24 in the piston rod and into the rod's interior area 26. From there, the fluid flows into opening 32 of the transfer tube and goes through the transfer tube. End 36 of the transfer tube is connected to passage 130 in the cylinder head, whereby the fluid flows from the transfer tube and into passage 130. The fluid can then flow through the now open pilot-operated check valve 112 and into passage 116. From passage 116, the fluid flows through port 68 of the main control valve, where it then is diverted into the fluid return passage 58 via port 56.

The fluid can then flow from passage 58 to hose 60, where it then flows back into the reservoir 64.

Once piston 12 has moved the desired distance to the left, the control/switch 104 is moved into a neutral position. This causes a stoppage of the electrical signal to solenoid 86. As a result, the plunger 89 of solenoid 86 pulls back to the right. This allows ball 96 to move into its seat and thereby seal the inlet to passage 100. The same plunger movement allows ball 90 to move off its seat, thereby allowing fluid from passage 74 to flow past rod 84 and into passage 94. The fluid then returns to the reservoir via return passage line 58 and hose 60. Since there is now equal pressure being applied to both ends of the main control valve's spool 42, springs 44 will cause the spool to become centered in the valve. This stops the flow of pressurized fluid to port 124 of pilot-operated check valve 110 and port 132 of pilot-operated check valve 112. With pressure no longer being applied to the poppet of either pilot-operated check valve, the poppets are forced outwardly by their associated springs 122 and each blocks its associated port 126. These actions effectively lock the piston 12 at the desired location within the cylinder's body portion.

To ensure that the piston 12 does not move once pressure is no longer being applied to the piston by the fluid, a fluid locking mechanism for the pilot-operated check valves is employed. When the weep hole 144 of either pilot-operated check valve is aligned with an adjacent port 126, a small amount of fluid will flow through the weep hole to pressurize the interior area of the poppet. As a result, the poppet cannot move to unblock port 126 until significant pressure is applied to the top of the poppet by pressurized fluid from one of the lines 114 or 116, or until fluid pressure is applied to the poppet's flange 142 via port 132.

To reverse the direction of movement of the piston, the above-described procedure is basically repeated, except that this time solenoid 88 is energized. This causes pilot valve 82 to supply pressurized fluid to the main control valve in a manner whereby slide 42 moves to the left. Pressurized fluid then flows out of the control valve, through pilot-operated check valve 112, into passage 130, through the transfer tube, into the interior of the piston rod, and then into area 16 in the body portion of the cylinder via ports 24 of the piston rod.

It should be noted that while specific types of valves have been described, other functionally-equivalent valves or structures may be substituted in their place. Additionally, in lieu of using a main control valve that is controlled by two pilot valves, a main control valve that is controlled by one pilot valve may alternatively be employed. As another alternative, the shown arrangement of a main control valve and two pilot valves can be replaced by a control valve that does not require any pilot valves for its operation. The latter valve would typically be of a type in which an electrical mechanism is directly connected to the valve and affects the valve's operation. A manually-actuated control valve can also be employed.

The preferred embodiment of the invention disclosed herein has been discussed for the purpose of familiarizing the reader with the novel aspects of the invention. Although a preferred embodiment of the invention has been shown and described, many changes, modifications and substitutions may be made by one having ordinary skill in the art without necessarily departing from the spirit and scope of the invention as described in the following claims.

We claim:

1. A hydraulic cylinder comprising:

an elongated body that inwardly contains a piston that is slidable within an interior cavity of said body, wherein said piston divides said cavity into first and second cavity portions, wherein said piston is attached to a portion of a piston rod, wherein sliding movement of said piston causes said piston rod to move;

a cylinder head located at one end of said body, wherein said cylinder head inwardly contains a main control valve capable of being connected to a source of pressurized fluid, wherein said main control valve is capable of being actuated by a user, and wherein when said valve is connected to a source of pressurized fluid and is then actuated by a user, pressurized fluid will flow from said main control valve through a passage in said cylinder head and into said first cavity portion in said body; and wherein said cylinder head also contains first and second pilot-operated check valves, wherein said first pilot-operated check valve is in a fluid path leading to the first cavity portion of said body, wherein said second pilot-operated check valve is in a fluid path leading to the second cavity portion of said body, wherein when said main control valve is connected to a source of pressurized fluid and is actuated in a predetermined manner, pressurized fluid will be directed to both of said pilot-operated check valves to thereby cause both pilot-operated check valves to open and allow pressurized fluid to flow through one of said check valves and continue to one of said cavity portions of said body while also enabling displaced fluid from the other of said cavity portions of said body to flow through the other of said check valves and be directed to a fluid reservoir via a fluid return passage, and wherein causing both of said check valves to open entails sending pressurized fluid to act on an end portion of a movable poppet located in one of said check valves while simultaneously sending pressurized fluid to act on a flange portion of a movable poppet located in the other of said check valves.

2. The hydraulic cylinder of claim 1 wherein said cylinder head also contains a pilot valve operatively connected to said main control valve and capable of causing said main control valve to initiate flow to the first cavity portion of said body, wherein said cylinder head also contains an electrically-actuable solenoid connected to said pilot valve, wherein said solenoid functions to control the operation of said pilot valve, wherein an electrical wire extends out of said cylinder and electrically connects said solenoid to a user-actuable switch, and wherein when a user actuates said switch, an electrical signal will be sent to said solenoid via said wire and cause said solenoid to affect said pilot valve in a manner whereby said pilot valve will affect said main control valve to cause pressurized fluid to be sent into the first cavity portion of said body to apply pressure on a surface of said piston.

3. The hydraulic cylinder of claim 1 wherein said piston rod includes a hollow interior area and at least one port connecting said hollow interior area to said second cavity portion of said body, and wherein a hollow transfer tube extends through a bore in said piston and into said hollow interior area of said piston rod, wherein said transfer tube is connected to said cylinder head and functions to transfer fluid between said main control valve and said second cavity portion of said body.

4. The hydraulic cylinder of claim 1 wherein a first clevis is secured to said cylinder head and a second clevis is secured to an end portion of said piston rod.

5. A hydraulic cylinder comprising:

an elongated body that inwardly contains a piston that is slidable within an interior cavity of said body, wherein said piston divides said cavity into first and second cavity portions, wherein said piston is attached to a portion of an elongated piston rod, wherein sliding movement of said piston causes said piston rod to move in a first axial direction; and a cylinder head located at one end of said body and extending outwardly from said body in a direction substantially parallel to said first axial direction, wherein said cylinder head inwardly contains a main control valve, first and second pilot valves operatively connected to said main control valve, and first and second solenoids, wherein said main control valve and said pilot valves are capable of being connected to a source of pressurized fluid and to a fluid reservoir, wherein said first pilot valve is operatively connected to said first solenoid and said second pilot valve is operatively connected to said second solenoid, wherein when a switch located remote from said hydraulic cylinder is electrically connected to said solenoids and to a power source, and wherein when said main control valve and said pilot valves are all connected to the same source of pressurized fluid and are also all connected to a fluid reservoir, and a user actuates said switch in a predetermined manner, said first solenoid will become energized and affect said first pilot valve to thereby cause said main control valve to direct pressurized fluid into the first cavity portion of said body and cause said piston to move within said body as fluid from said second cavity portion of said body is directed to a reservoir via the main control valve.

6. The hydraulic cylinder of claim 5 wherein said piston rod includes a hollow interior area and at least one port connecting said hollow interior area to said second cavity portion of said body, wherein a hollow transfer tube extends through a bore in said piston and into said hollow interior area of said piston rod, and wherein said transfer tube is connected to said cylinder head in a manner whereby fluid can travel between said main control valve and said second cavity portion of said body via said transfer tube.

7. The hydraulic cylinder of claim 6 further comprising a seal in said bore in said piston, wherein said piston is capable of moving relative to said transfer tube and said seal functions to prevent fluid from passing around said transfer tube and traveling through said bore from said first cavity portion to said second cavity portion of said body.

8. The hydraulic cylinder of claim 7 wherein said seal is at least partially made of a TEFLON material.

9. The hydraulic cylinder of claim 5 wherein said cylinder head also contains first and second pilot-operated check valves, wherein said first pilot-operated check valve is in a fluid path leading to the first cavity portion of said body, wherein said second pilot-operated check valve is in a fluid path leading to the second cavity portion of said body, and wherein pressurized fluid from said main control valve can be directed to both check valves at substantially the same time to thereby open both of said check valves substantially simultaneously when the main control valve is actuated in a predetermined manner.

10. The hydraulic cylinder of claim 9 wherein each of said pilot-operated check valves includes a mechanism for fluidically-biasing itself into a closed position.

11. The hydraulic cylinder of claim 10 wherein each of said pilot-operated check valves includes a movable poppet, wherein said mechanism for biasing each of said pilot-operated check valves to a closed position is in the form of a weep hole located in a side portion of each of said poppets, and wherein when said weep hole is exposed to the associated pilot-operated check valve's fluid port that is fluidically connected to one of said cavity portions of said body, said weep hole will allow fluid to flow into an otherwise sealed interior area of said poppet whereby movement of the poppet is prevented by the incompressibility of the fluid located within the poppet.

12. The hydraulic cylinder of claim 5 wherein a first tube member connects said cylinder head to a source of pressurized fluid, wherein a second tube member connects said cylinder head to a fluid reservoir, and wherein said switch is connected to said solenoids by a wire that extends through one of said tube members.

13. A hydraulic cylinder comprising:
an elongated body that inwardly contains a piston that is slidable within an interior cavity of said body, wherein said piston divides said cavity into first and second cavity portions, wherein said piston is attached to a portion of an elongated piston rod, wherein sliding movement of said piston causes said piston rod to move in a direction parallel to a longitudinal axis of said body, wherein a portion of said piston rod is hollow and contains a fluid outlet that opens into said first cavity portion, and wherein a portion of said piston rod is capable of extending outwardly from a first end of said body;
a cylinder head located at a second end of said body, wherein said cylinder head inwardly contains a main control valve, a pilot valve, and a solenoid, wherein said main control valve is capable of being connected to a source of pressurized fluid and to a fluid reservoir, wherein said pilot valve is capable of being connected to a source of pressurized fluid, wherein said pilot valve is also operatively connected to said main control valve and operatively connected to said solenoid, wherein when a power source and a switch, both located exterior to said hydraulic cylinder, are electrically connected to said solenoid, and said main control valve and said pilot valve are connected to a source of pressurized fluid and to a fluid reservoir, and a user actuates said switch in a predetermined manner, said solenoid will become energized and affect said pilot valve to cause pressurized fluid to be directed to said main control valve in a manner that causes said main control valve to send pressurized fluid into the first cavity portion of said body via a transfer tube that extends through a centrally-located thru-bore in said piston and into said hollow portion of said piston rod, wherein said pressurized fluid will cause said piston to move within said body as fluid from said second cavity portion of said body is directed to a reservoir via said main control valve; and wherein said body and cylinder head form an elongated unit that has a space envelope having a substantially uniform diameter.

14. The hydraulic cylinder of claim 13 further comprising a first clevis located on a distal end portion of said piston rod, and a second clevis located on an end portion of said cylinder head.

15. A hydraulic cylinder comprising:
an elongated body that inwardly contains a piston that is slidable within an interior cavity of said body, wherein said piston divides said cavity into first and second cavity portions, wherein said piston is attached to a portion of a piston rod, and wherein sliding movement of said piston causes said piston rod to move;
a cylinder head located at one end of said body, wherein said cylinder head inwardly contains a main control valve operatively connected to said first and second cavity portions and capable of being connected to a source of pressurized fluid; and
wherein said cylinder head also contains first and second pilot-operated check valves, wherein said first pilot-operated check valve controls fluid flow in a first fluid path that extends between said main control valve and the first cavity portion of said body, wherein the second pilot-operated check valve controls fluid flow in a second fluid path that extends between said main control valve and the second cavity portion of said body, wherein a third fluid path extends between the first fluid path and a structure associated with the second pilot-operated check valve, wherein when pressurized fluid acts on said structure, the second pilot-operated check valve will be caused to open, wherein when said main control valve is connected to a source of pressurized fluid and to a fluid reservoir and is actuated in a predetermined manner, pressurized fluid will travel from said main control valve into said first fluid path and then into said third fluid path whereby said fluid will thereby cause both of said pilot-operated check valves to open and allow pressurized fluid to flow through said first pilot-operated check valve and continue to said first cavity portion of said body while also enabling fluid from said second cavity portion of said body to flow through the second pilot-operated check valve and be directed to said fluid reservoir via said main control valve.

* * * * *